US009455856B2

(12) United States Patent
Tian et al.

(10) Patent No.: US 9,455,856 B2
(45) Date of Patent: Sep. 27, 2016

(54) METHOD AND APPARATUS FOR FEEDING BACK CHANNEL STATE INFORMATION (71) Applicant: Huawei Technologies Co., Ltd., Shenzhen, Guangdong (CN)

(72) Inventors: Chunchang Tian, Beijing (CN); Yong Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 14/310,905

(22) Filed: Jun. 20, 2014

(65) Prior Publication Data

US 2014/0313976 A1 Oct. 23, 2014

Related U.S. Application Data (63) Continuation of application No. PCT/CN2012/086835, filed on Dec. 18, 2012.

(30) Foreign Application Priority Data

Dec. 23, 2011 (CN) .......................... 2011 1 0439303

(51) Int. Cl.
*H04W 80/04* (2009.01)
*H04L 27/26* (2006.01)
(Continued)

(52) U.S. Cl.
CPC .......... *H04L 27/2601* (2013.01); *H04B 7/063* (2013.01); *H04B 7/0626* (2013.01); *H04B 7/0639* (2013.01); *H04B 7/10* (2013.01)

(58) Field of Classification Search
CPC ... H04W 80/04; H04W 84/12; H04W 88/06; H04W 88/08; H04W 84/18
See application file for complete search history.

(56) References Cited

U.S. PATENT DOCUMENTS 8,842,606 B2* 9/2014 Denteneer ............. H04L 5/0023
370/328
2005/0117508 A1* 6/2005 Gaal ....................... H04J 13/10
370/209
(Continued)

FOREIGN PATENT DOCUMENTS

CN 101635612 A 1/2010
CN 101834698 A 9/2010
(Continued)

OTHER PUBLICATIONS

Fang Yuan, et al., "Weighted DFT Codebook for Multiuser MIMO in Spatially Correlated Channels", IEEE, 2011, 5 pages.
(Continued)

*Primary Examiner* — Hassan Phillips
*Assistant Examiner* — Prenell Jones (57) ABSTRACT In solutions provided in embodiments of the present application, a second orthogonal basis vector group and a group number of the second orthogonal basis vector group are determined according to a pre-defined first basis vector group, a third orthogonal basis vector group corresponding to each data layer is determined according to the second orthogonal basis vector group, then a second-level code word of each data layer is calculated separately, and the group number of the second orthogonal basis vector group, the third orthogonal basis vector group corresponding to the each data layer, and the second-level code word corresponding to the each data layer are sent to a base station, so that the base station may synthesize a multi-layer code word.

20 Claims, 5 Drawing Sheets (51) Int. Cl.
*H04B 7/06* (2006.01)
*H04B 7/10* (2006.01)

(56) References Cited

U.S. PATENT DOCUMENTS

| | | |
|---|---|---|
| 2008/0232501 A1 | 9/2008 | Khojastepour et al. |
| 2009/0004986 A1 | 1/2009 | Park et al. |
| 2009/0112607 A1* | 4/2009 | Ashley ............... G10L 19/24 704/500 |
| 2010/0238913 A1 | 9/2010 | Xia et al. |
| 2010/0322331 A1 | 12/2010 | Sun et al. |
| 2011/0080969 A1 | 4/2011 | Jongren et al. |
| 2011/0150004 A1* | 6/2011 | Denteneer ............ H04L 5/0023 370/476 |
| 2011/0274182 A1 | 11/2011 | Mielczarek et al. |
| 2012/0219082 A1* | 8/2012 | Sarperi ............ H04L 25/03203 375/267 |
| 2014/0098689 A1* | 4/2014 | Lee .................... H04B 7/0469 370/252 |
| 2014/0301496 A1 | 10/2014 | Ko et al. |
| 2015/0103939 A1 | 4/2015 | Yu et al. |

FOREIGN PATENT DOCUMENTS

| | | |
|---|---|---|
| CN | 101924585 A | 12/2010 |
| CN | 101924612 A | 12/2010 |
| CN | 102084612 A | 6/2011 |
| WO | WO 2009/030036 A1 | 3/2009 |
| WO | WO 2010/079748 A1 | 7/2010 |
| WO | WO 2011/126341 A2 | 10/2011 |

OTHER PUBLICATIONS

Cheol Mun, et al., "Quantized Principal Component Selection Precoding for Limited Feedback Spatial Multiplexing", IEEE, Jun. 1, 2006, p. 4149-4154.

"Spatial CSI Feedback Based on Kronecker Product", ZTE, TSG-RAN WG1 #59-bis, Jan. 18-22, 2010, 4 pages.

* cited by examiner

FIG. 3 a. Vertical, Horizontal, Polarization
3-dimensional b. Vertical, Horizontal,
2-dimensional c. Horizontal, Polarization
2-dimensional d. Vertical, Polarization
2-dimensional

METHOD AND APPARATUS FOR FEEDING BACK CHANNEL STATE INFORMATION

CROSS-REFERENCE TO RELATED APPLICATION

This application is a continuation of International Application No. PCT/CN2012/086835, filed on Dec. 18, 2012, which claims priority to Chinese Patent Application No. 201110439303.X, filed on Dec. 23, 2011, both of which are hereby incorporated by reference in their entireties.

TECHNICAL FIELD

The present application relates to the field of communication network technologies, and in particular, to a method and an apparatus for feeding back channel state information.

BACKGROUND

An MIMO (Multiple Input Multiple Output, multiple input multiple output) technology is one of the most important technologies for improving spectral efficiency of a wireless system. In an MIMO system, generally, a good transmission effect can be achieved only when a transmitter learns a channel, while in an FDD (Frequency Division Duplexing, frequency division duplexing) system, generally, a receiver feeds back channel state information to a transmitter. Therefore, which method is adopted to feed back the channel state information is a hotspot in a standard design.

In the prior art, when the channel state information is fed back, first a channel eigenvector is quantified by performing weighted combination on multiple DFT (Discrete Fourier Transform, discrete Fourier transform) codebooks, and then a first-level code word is fed back in a relatively long period, where the first-level code word includes a channel statistical central angle, an offset value relative to the central angle, and the number of DFT vectors contained in the first-level code word. In a ULA (Uniform Linear Array, uniform linear array) placed horizontally, a DFT code word is generally determined by a horizontal pointing angle, and horizontal pointing angles corresponding to multiple DFT code words are continuous, so the number of the code words and an offset value of each code word may be used to represent the DFT vector. Then a second-level code word is fed back in a relatively short period, and the code word may be selected from a GLP (Grassmannian Linear Packing) or RVQ (Random Vector Quantization) codebook.

However, when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable.

SUMMARY

Embodiments of the present application provide a method and an apparatus for feeding back channel state information, which can feed back channel state information in multi-layer data transmission based on a synthetic codebook in a multi-dimensional antenna array and reduce the number of feedback bits.

In order to achieve the objective, the embodiments of the present application adopt the following technical solutions:

A method for feeding back channel state information includes:

determining a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction;

determining a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1;

calculating a second-level code word of each data layer separately according to the third orthogonal basis vector group corresponding to the each data layer; and sending the group number of the second orthogonal basis vector group, the third orthogonal basis vector group corresponding to the each data layer, and the second-level code word corresponding to the each data layer to a base station, so that the base station may synthesize a multi-layer code word.

An apparatus for feeding back channel state information includes:

a second orthogonal basis vector group determination unit, configured to determine a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction;

a third orthogonal basis vector group determination unit, configured to determine a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1;

a calculation unit, configured to calculate a second-level code word of each data layer separately according to the third orthogonal basis vector group corresponding to the each data layer; and a sending unit, configured to send the group number of the second orthogonal basis vector group, the third orthogonal basis vector group corresponding to the each data layer, and the second-level code word corresponding to the each data layer to a base station, so that the base station may synthesize a multi-layer code word.

According to the method and the apparatus for feeding back channel state information provided in the embodiments of the present application, a second orthogonal basis vector group and a group number of the second orthogonal basis vector group are determined according to a pre-defined first basis vector group, a third orthogonal basis vector group corresponding to each data layer is determined according to the second orthogonal basis vector group, then a second-level code word of each data layer is calculated separately, and the group number of the second orthogonal basis vector group, the third orthogonal basis vector group corresponding to the each data layer, and the second-level code word corresponding to the each data layer are sent to a base station, so that the base station may synthesize a multi-layer code word. Compared with that when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable, in the solutions provided in the embodiments of the present application, the channel state information may be fed back in multi-layer data transmission based on a synthetic codebook in a multi-dimensional antenna array and the number of feedback bits may be reduced.

BRIEF DESCRIPTION OF THE DRAWINGS

To illustrate the technical solutions according to the embodiments of the present application or in the prior art more clearly, the following briefly introduces the accompanying drawings required for describing the embodiments or the prior art. Apparently, the accompanying drawings in the following description are only some embodiments of the present application, and persons of ordinary skill in the art can derive other drawings from the accompanying drawings without creative efforts.

DETAILED DESCRIPTION

The technical solutions of the present application will be clearly described in the following with reference to the accompanying drawings. It is obvious that the embodiments to be described are only a part rather than all of the embodiments of the present application. All other embodiments obtained by persons of ordinary skill in the art based on the embodiments of the present application without creative efforts shall fall within the protection scope of the present application.

Embodiment 1

Figure 1:
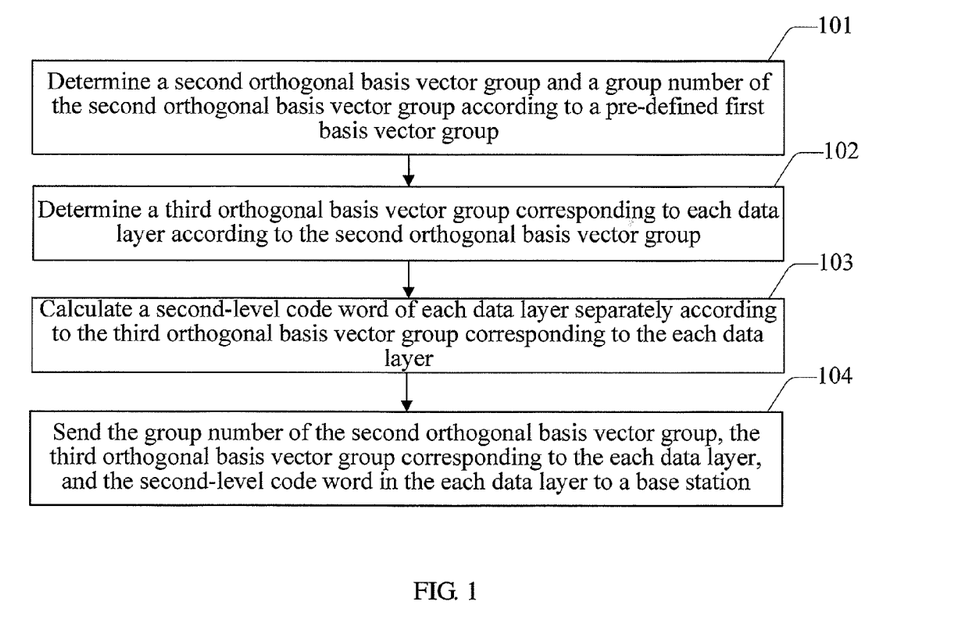
FIG. 1 is a flow chart of a method for feeding back channel state information according to Embodiment 1 of the present application.

The embodiment of the present application provides a method for feeding back channel state information. As shown in FIG. 1, the method includes:

Step 101: Determine a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction.

Step 102: Determine a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1.

Specifically, the number $K(i)$ of the basis vectors of the third orthogonal basis vector group corresponding to the $i^{th}$ data layer is determined.

According to each code word in the second orthogonal basis vector group, a correlation coefficient between the each code word and a channel eigenvector of the $i^{th}$ data layer is calculated, and the correlation coefficients are sorted in descending order.

According to the $K(i)$, the code word corresponding to the former $K(i)$ correlation coefficients sorted in descending order is determined as the third orthogonal basis vector group corresponding to the $i^{th}$ data layer.

According to the method for determining the third orthogonal basis vector group, the third orthogonal basis vector group corresponding to the each data layer is determined.

The third orthogonal basis vector groups corresponding to the data layers are orthogonal to each other and an intersection set between the third orthogonal basis vector groups is null.

Step 103: Calculate a second-level code word of each data layer separately according to the third orthogonal basis vector group corresponding to the each data layer.

Specifically, according to the third orthogonal basis vector group corresponding to the $i^{th}$ data layer, the second-level code word corresponding to the $i^{th}$ data layer is calculated, namely, according to $v_e(i)=G(i)x(i)$, the second-level code word $x(i)$ corresponding to the $i^{th}$ data layer is calculated, where $v_e(i)$ is a channel eigenvector of the $i^{th}$ data layer and $G(i)$ is a matrix formed by all vectors in the third orthogonal basis vector group corresponding to the $i^{th}$ data layer.

According to the method for calculating the second-level code word, the second-level code word corresponding to each data layer is calculated.

Step 104: Send the group number of the second orthogonal basis vector group, the third orthogonal basis vector group corresponding to the each data layer, and the second-level code word in the each data layer to a base station, so that the base station may synthesize a multi-layer code word.

Specifically, a first feedback message is sent to the base station, where the first feedback message includes the group number of the second orthogonal basis vector group and the third orthogonal basis vector group corresponding to the each data layer.

A second feedback message is sent to the base station, where the second feedback message includes the second-level code word in the each data layer.

Alternatively, the first feedback message and the second feedback message are sent to the base station separately in a manner of performing transmission at least once; or the first feedback message and the second feedback message are sent to the base station at the same time.

According to the method for feeding back channel state information provided in the embodiment of the present application, a second orthogonal basis vector group and a group number of the second orthogonal basis vector group are determined according to a pre-defined first basis vector group, a third orthogonal basis vector group corresponding to each data layer is determined according to the second orthogonal basis vector group, then a second-level code word of each data layer is calculated separately, and the group number of the second orthogonal basis vector group, the third orthogonal basis vector group corresponding to the each data layer, and the second-level code word corresponding to the each data layer are sent to a base station, so that the base station may synthesize a multi-layer code word. Compared with that when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable, in the solutions provided in the embodiment of the present application, the channel state information may be fed back in multi-layer data transmission based on a synthetic codebook in a multi-dimensional antenna array and the number of feedback bits may be reduced.

Figure 2:
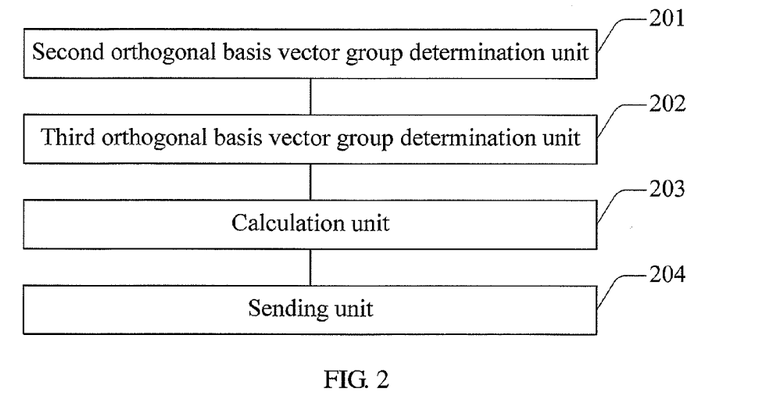
FIG. 2 is a block diagram of an apparatus for feeding back channel state information according to Embodiment 1 of the present application.

The embodiment of the present application provides an apparatus for feeding back channel state information. As shown in FIG. 2, the apparatus includes: a second orthogonal basis vector group determination unit 201, a third orthogonal basis vector group determination unit 202, a calculation unit 203, and a sending unit 204.

The second orthogonal basis vector group determination unit 201 is configured to determine a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction.

The third orthogonal basis vector group determination unit 202 is configured to determine a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1.

The calculation unit 203 is configured to separately calculate a second-level code word in the each data layer according to the third orthogonal basis vector group corresponding to the each data layer.

The sending unit 204 is configured to send the group number of the second orthogonal basis vector group, the third orthogonal basis vector group corresponding to the each data layer, and the second-level code word corresponding to the each data layer to a base station, so that the base station may synthesize a multi-layer code word.

According to the apparatus for feeding back channel state information provided in the embodiment of the present application, the second orthogonal basis vector group determination unit determines a second orthogonal basis vector group and a group number of the second orthogonal basis vector group according to a pre-defined first basis vector group, the third orthogonal basis vector group determination unit determines a third orthogonal basis vector group corresponding to each data layer according to the second orthogonal basis vector group, then the calculation unit separately calculates a second-level code word in the each data layer, and the sending unit sends the group number of the second orthogonal basis vector group, the third orthogonal basis vector group corresponding to the each data layer, and the second-level code word corresponding to the each data layer to a base station, so that the base station may synthesize a multi-layer code word. Compared with that when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable, in the solutions provided in the embodiment of the present application, the channel state information may be fed back in multi-layer data transmission based on a synthetic codebook in a multi-dimensional antenna array and the number of feedback bits may be reduced.

Embodiment 2

Figure 3:
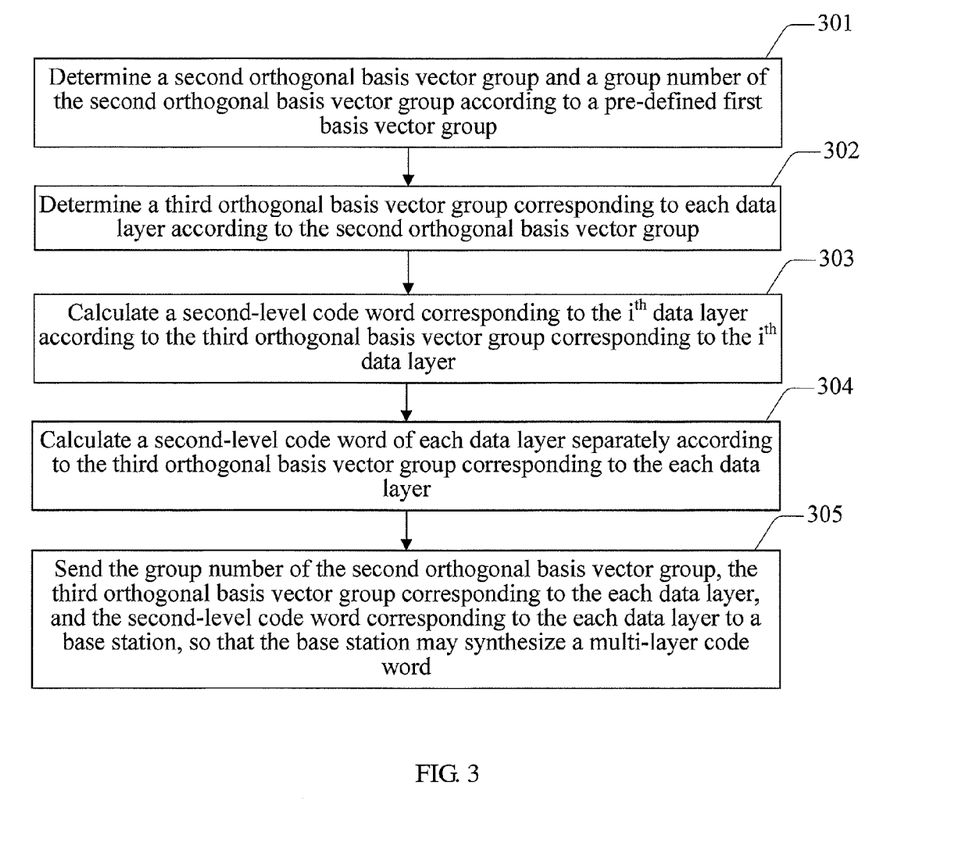
FIG. 3 is a flow chart of a method for feeding back channel state information according to Embodiment 2 of the present application.

The embodiment of the present application provides a method for feeding back channel state information. As shown in FIG. 3, the method includes:

Step 301: Determine a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction.

The pre-defined first basis vector group is $C_1=\{f_1, f_2, \ldots, f_B\}$, where B is the total number of wave beams, $B=B_a \times B_p \times B_e$, $B \geq N_T$ and $N_T$ is the number of antennas in an antenna array. A basis vector of the first basis vector group is constructed by an azimuth component (azimuth), a polar component (polar), and an elevation component (elevation) by means of the Kronecker product: $f_i = e_a(i_a) \otimes e_p(i_p) \otimes e_e(i_e)$ and $e_*(i_*)=[1, e^{j(\phi_*(i_*))}, \ldots, e^{j(N_*-1)\phi_*(i_*)}]^T$, $i_*=1, \ldots, B_*$, where $\phi_*(i_*)=2\pi(i_*-1)/B_*+\phi_0$ and $\phi_0 \in [0, 2\pi]$ is any initial phase. Additionally, sequences of Kronecker products of components forming the basis vector are not fixed and are interchangeable.

Figure 4:
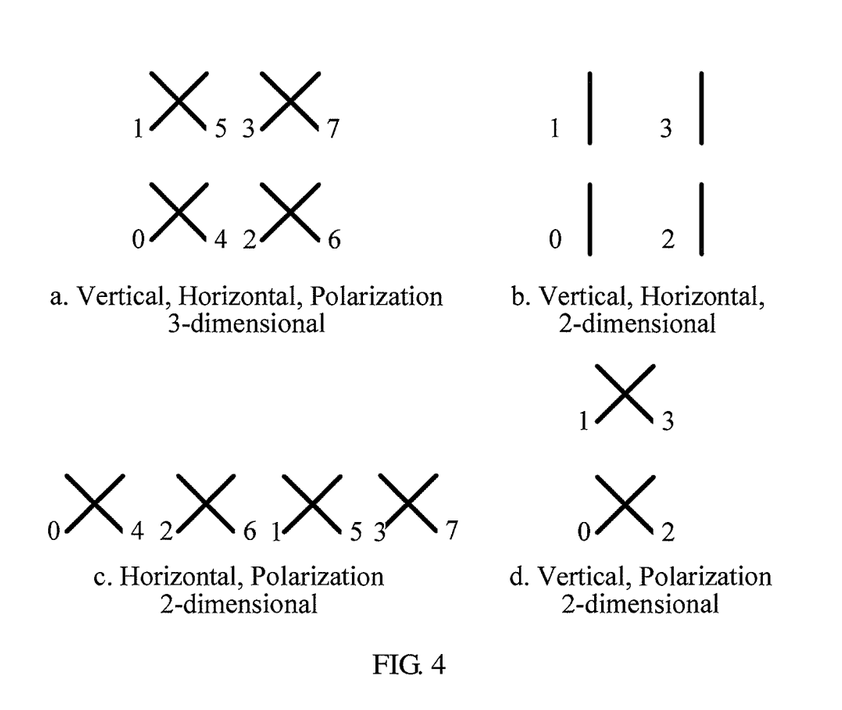
FIG. 4 is a schematic diagram of multiple types of multi-dimensional antenna arrays according to Embodiment 2 of the present application.

It should be noted that, as shown in FIG. 4, which is schematic diagrams of multiple types of multi-dimensional antenna arrays, the multi-dimension includes a vertical direction dimension, a horizontal direction dimension, and a polarization direction dimension, where the definition of the dimension relates to a reference direction. The antenna in FIG. 4 (a) is in three dimensions of the vertical direction, the horizontal direction, and the polarization direction; the antenna in FIG. 4 (b) is in two dimensions of the vertical direction and the horizontal direction; the antenna in FIG. 4 (c) is in two dimensions of the horizontal direction and the polarization direction; and the antenna in FIG. 4 (d) is in two dimensions of the vertical direction and the polarization direction. The antenna herein may be a physical antenna or may be an equivalent port formed by multiple physical antennas.

Specifically, two manners for determining the second orthogonal basis vector group and the group number of the second orthogonal basis vector group are in the following.

Manner 1:

① Group the pre-defined first basis vector group and obtain at least one orthogonal basis vector group.

According to the pre-defined first basis vector group C1, $S=B/N_T$ basis vector groups that are orthogonal to each other may be divided, and each basis vector of the first basis vector group is a Kronecker product of basis vectors corresponding to at least two directions of the horizontal direction, the vertical direction, and the polarization direction.

Specifically, according to the pre-defined first basis vector group, an orthogonal basis vector group in at least two directions of the horizontal direction, the vertical direction, and the polarization direction is determined separately.

For example, Na antennas are in the horizontal direction and Ba wave beams are pre-defined in the horizontal direction. Generally, Ba is a multiple of Na. Therefore, Sa=Ba/Na groups of orthogonal basis vectors may be divided in the horizontal direction. Taking $e_a(i_a)$ as an example, $\{e_a(ii) | ii = mod(i_a+k*S_a, B_a), k=0, \ldots, N_a-1\}$ forms a group of orthogonal basis vectors. Therefore, the following table describes orthogonal basis vector groups in the horizontal direction, the vertical direction, and the polarization direction.

| Dimension | Basis vector group in each dimension |
|---|---|
| Horizontal direction | Totally Sa groups of basis vectors, $\{e_a(ii) \mid ii = \mathrm{mod}(i_a + k * S_a, B_a), k = 0, \ldots, N_a - 1\}$, and $i_a$ may be any continuous Sa integers. For example, $i_a = 1, 2, \ldots, S_a$. |
| Vertical direction | Totally Se groups of basis vectors, $\{e_e(ii) \mid ii = \mathrm{mod}(i_e + k * S_e, B_e), k = 0, \ldots, N_e - 1\}$, and $i_e$ may be any continuous Se integers. For example, $i_e = 1, 2, \ldots, S_e$. |
| Polarization direction | Totally Sp groups of basis vectors, $\{e_p(ii) \mid ii = \mathrm{mod}(i_p + k * S_p, B_p), k = 0, \ldots, N_p - 1\}$, and $i_p$ may be any continuous Sp integers. For example, $i_p = 1, 2, \ldots, S_p$. |

For a basis vector group in the above each direction, a group is selected randomly from the orthogonal basis vector groups in at least two directions of the horizontal direction, the vertical direction, and the polarization direction separately to form an orthogonal basis vector group and obtain at least one orthogonal basis vector group. It should be noted that, a multi-dimensional orthogonal basis vector group may be marked by S, where the S is a positive integer. Additionally, a multi-dimensional number group {S1, S2, S3} may also be corresponding to a certain basis vector group exclusively in a pre-defined manner, where S1, S2, and S3 are separately corresponding to different dimensions, and the sequence of each dimension is not fixed and may be combined randomly.

② Traverse each code word in any one of the orthogonal basis vector group and separately calculate a correlation coefficient between the each code word and a channel eigenvector to be quantified in each data layer.

For example, a group is selected randomly from the above basis vector groups as C2, and based on multi-layer transmission, such as L data layers, a correlation coefficient between each code word in the C2 and a eigenvector to be quantified in the $i^{th}$ data layer needs to be calculated, where i is any layer of the L data layers. Specifically, the correlation coefficient is calculated according to $\rho = |v_e^H f_i|$, where $v_e$ is the channel eigenvector and $f_i$ is a code word in the basis vector group.

③ Determine a maximum correlation coefficient in the correlation coefficients of the channel eigenvector of the each data layer according to the calculated correlation coefficients.

The maximum correlation coefficient in the correlation coefficients in the $i^{th}$ data layer is determined. Additionally, a code word corresponding to the maximum correlation coefficient needs to be further determined.

④ Calculate the sum of the maximum correlation coefficients and obtain a first correlation coefficient sum.

According to the above method, the maximum correlation coefficient in each data layer of the L data layers is determined, and the sum of the maximum correlation coefficients in the data layers is calculated, namely, the sum of the maximum correlation coefficients in the data layers in the C2 is determined.

⑤ According to the method for calculating the sum of the maximum correlation coefficients, determine the sum of the maximum correlation coefficients in all groups and obtain first correlation coefficient sums in all the groups.

⑥ According to the first correlation coefficient sums in all the groups, determine a group where a maximum first correlation coefficient sum is located as the second orthogonal basis vector group, and determine the group number of the second orthogonal basis vector group, namely, C2(s).

Manner 2:

① Group the pre-defined first basis vector group and obtain at least one orthogonal basis vector group.

The method of step ① is the same as the method of step ① in Manner 1. For details, reference is made to step ① in Manner 1.

② Traverse each code word in any one of the orthogonal basis vector group, calculate a correlation coefficient between the each code word and the channel eigenvector to be quantified in the $i^{th}$ data layer separately, and sort the calculated correlation coefficients of the channel eigenvector of the $i^{th}$ data layer in descending order, where i is a positive integer and the $i^{th}$ data layer is any one of data layers in a transmission channel.

③ According to the number of preset code words, calculate the sum of the former K(i) correlation coefficients of the correlation coefficients sorted in descending order, where K(i) is the number of the preset code words.

④ According to the method for calculating the sum of the correlation coefficients, calculate a correlation coefficient between the each code word and the channel eigenvector to be quantified in each data layer separately, and calculate the sum of correlation coefficients of the number corresponding to the number of the preset code words after the correlation coefficients are sorted in descending order.

According to the above method, similarly, for the channel eigenvector to be quantified in the $(i+1)^{th}$ data layer, after the correlation coefficient between each code word in the C2 and the channel eigenvector is calculated, the correlation coefficients are sorted in descending order, and the sum of K(i+1) correlation coefficients is calculated.

⑤ Calculate sums of the correlation coefficients of the channel eigenvectors to be quantified in all data layers and obtain a second correlation coefficient sum.

All the sums of the correlation coefficients in the L data layers are added to obtain the second correlation coefficient sum in the C2.

⑥ According to the second correlation coefficient sums in all groups, determine a group where a maximum second correlation coefficient sum is located as the second orthogonal basis vector group, and determine the group number of the second orthogonal basis vector group, namely, C2(s).

Step 302: Determine a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1.

According to the determined second orthogonal basis vector group C2(s), for the $i^{th}$ data layer, the third orthogonal basis vector group $C_3(i) \subseteq C_2(s)$ corresponding to the $i^{th}$ data layer needs to be selected. Specifically, the determining the third orthogonal basis vector group corresponding to the each data layer includes the following sub-steps.

① Determine the number K(i) of basis vectors of a third orthogonal basis vector group corresponding to the $i^{th}$ data layer.

Specifically, it may be obtained through an indication of a base station or may be obtained through a selection algorithm at a UE end.

② According to each code word in the second orthogonal basis vector group, calculate a correlation coefficient between the each code word and the channel eigenvector of the $i^{th}$ data layer and sort the correlation coefficients in descending order.

③ According to the K(i), determine the code word corresponding to the former K(i) correlation coefficients sorted in descending order as the third orthogonal basis vector group corresponding to the $i^{th}$ data layer.

It should be noted that, each code word in the C2 has a serial number specifically ranging from 1 to L, where L is the number of the data layers. The code word in the third orthogonal basis vector group may be numbered according to the serial number of the code word in the C2. Here, K(i) serial numbers may be obtained and the range of the serial numbers is from 1 to the number of code word vectors in the C2.

④ According to the method for determining the third orthogonal basis vector group, determine the third orthogonal basis vector group corresponding to the each data layer.

When the third orthogonal basis vector group is determined, the vectors in the third orthogonal basis vector group corresponding to the each data layer may or may not include repetitive vectors. Preferentially, it may be selected that the vectors in the third orthogonal basis vector group corresponding to the each data layer does not include repetitive vectors, so that a feedback quantity of the channel state information fed back to the base station is large and feedback performance is good.

When the number of vectors in the third orthogonal basis vector group corresponding to the each data layer is equal to 1, a second-level code word no longer needs to be calculated, and the group number of the second orthogonal basis vector group and the third orthogonal basis vector group corresponding to the each data layer may be directly fed back to the base station. When in the third orthogonal basis vector group corresponding to the each data layer, the number of vectors in at least one group is greater than 1, the second-level code word corresponding to the each data layer needs to be calculated. When the channel state information is fed back to the base station, the group number of the second orthogonal basis vector group, the third orthogonal basis vector group corresponding to the each data layer, and the second-level code word corresponding to the each data layer need to be sent to the base station. In the embodiment of the present application, that the number of vectors in the third orthogonal basis vector group corresponding to the each data layer is greater than 1 is illustrated in detail.

It should be noted that, the third orthogonal basis vector group corresponding to the each data layer is a subset of the second orthogonal basis vector group, and the intersection set between the third orthogonal basis vector groups in the each data layers is null and the third orthogonal basis vector groups are orthogonal to each other, so the number of feedback bits can be greatly reduced.

Step 303: Calculate a second-level code word corresponding to the $i^{th}$ data layer according to the third orthogonal basis vector group corresponding to the $i^{th}$ data layer.

Specifically, the finally determined third orthogonal basis vector group C3(i) in the $i^{th}$ data layer is recorded as: $C_3(i)=\{b_1, b_2, \ldots, b_{K(I)}\}$, where $b_k$ is a code word vector selected from the C2(s). All vectors in the C3(i) form a matrix: $G(i)=[b_1, \ldots, b_k, \ldots, b_{K(I)}]$, $b_k \in C_3(i) \subseteq C_2$. According to $v_e(i)=G(i)x(i)$, the second-level code word x(i) corresponding to the $i^{th}$ data layer is calculated, where $v_e(i)$ is a channel eigenvector of the $i^{th}$ data layer, G(i) is a matrix formed by all vectors in the third orthogonal basis vector group corresponding to the $i^{th}$ data layer; and $x(i)=(G(i)^H G(i))^{-1}G(i)^H v_e(i)$ is obtained. The currently selected basis vectors are orthogonal to each other, so $x(i)=G(i)^H v_e(i)$.

Step 304: Calculate a second-level code word of each data layer separately according to the third orthogonal basis vector group corresponding to the each data layer.

It should be noted that, basis vectors in the second orthogonal basis vector group are orthogonal to each other, and the intersection set between the third orthogonal basis vector groups in the data layers is null, so multi-layer code words synthesized at a base station side are orthogonal to each other. In this way, the number of feedback bits may be reduced and a gain brought by a synthetic codebook may be more significant.

Step 305: Send the group number of the second orthogonal basis vector group, the third orthogonal basis vector group corresponding to the each data layer, and the second-level code word corresponding to the each data layer to a base station, so that the base station may synthesize a multi-layer code word.

It should be noted that, when the third orthogonal basis vector group corresponding to the each data layer is sent to the base station, the following two situations are included. In the first situation, if the base station specifies the number of vectors in the third orthogonal basis vector group, only the serial number of each vector in the C2 needs to be fed back; in the second situation, if a terminal decides the number of vectors in each third orthogonal basis vector group, the number of vectors in each third orthogonal basis vector group and the corresponding serial number of vectors in the C2 need to be fed back.

When the second-level code word corresponding to the each data layer is sent to the base station, vectors in the third orthogonal basis vector group are orthogonal, so [K(i)−1] X(i)s may only be fed back.

Specifically, a first feedback message is sent to the base station, where the first feedback message includes the group number of the second orthogonal basis vector group and the third orthogonal basis vector group corresponding to the each data layer; and a second feedback message is sent to the base station, where the second feedback message includes the second-level code word in the each data layer.

It should be noted that, because of different generating manners and different feedback periods of a second orthogonal basis vector, a third orthogonal basis vector, and the second-level code word, the first feedback message and the second feedback message are separately sent to the base station. Specifically, the first feedback message is sent to the base station in a manner of performing sending at least once, and the second feedback message is sent to the base station in a manner of performing sending at least once.

Alternatively, the first feedback message and the second feedback message are sent to the base station at the same time and the first feedback message and the second feedback message are packaged. The packaged first feedback message and second feedback message are sent to the base station in a manner of performing sending at least once.

It can be seen that, both the matrix formed by the third orthogonal basis vector group required to be fed back and the second-level code word relate to the number of the basis vectors in the third orthogonal basis vector group, and do not directly relate to the number of antennas. Therefore, the magnitude of the feedback quantity may be better decided according to an actual channel characteristic.

It should be noted that, the base station obtains G=[G[1] . . . G[i] . . . G[L]] and $$X = \begin{bmatrix} x[1] & 0 & 0 & 0 & 0 \\ 0 & \ldots & 0 & 0 & 0 \\ 0 & 0 & x[i] & 0 & 0 \\ 0 & 0 & 0 & \ldots & 0 \\ 0 & 0 & 0 & 0 & x[L] \end{bmatrix}$$

according to the first feedback message and the second feedback message and obtains a quantified channel eigenvector matrix: W=GX, where G is a matrix formed by the third orthogonal basis vector group corresponding to the each data layer, and x is the second-level code word corresponding to the each data layer.

According to the method for feeding back channel state information provided in the embodiment of the present application, a second orthogonal basis vector group and a group number of the second orthogonal basis vector group are determined according to a pre-defined first basis vector group, a third orthogonal basis vector group corresponding to each data layer is determined according to the second orthogonal basis vector group, then a second-level code word in each data layer is calculated separately, and the group number of the second orthogonal basis vector group, the third orthogonal basis vector group corresponding to the each data layer, and the second-level code word corresponding to the each data layer are sent to a base station, so that the base station may synthesize a multi-layer code word. Compared with that when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable, in the solutions provided in the embodiments of the present application, the channel state information may be fed back in multi-layer data transmission based on a synthetic codebook in a multi-dimensional antenna array, and the number of feedback bits may be reduced so as to improve a gain brought by the synthetic codebook.

Figure 5:
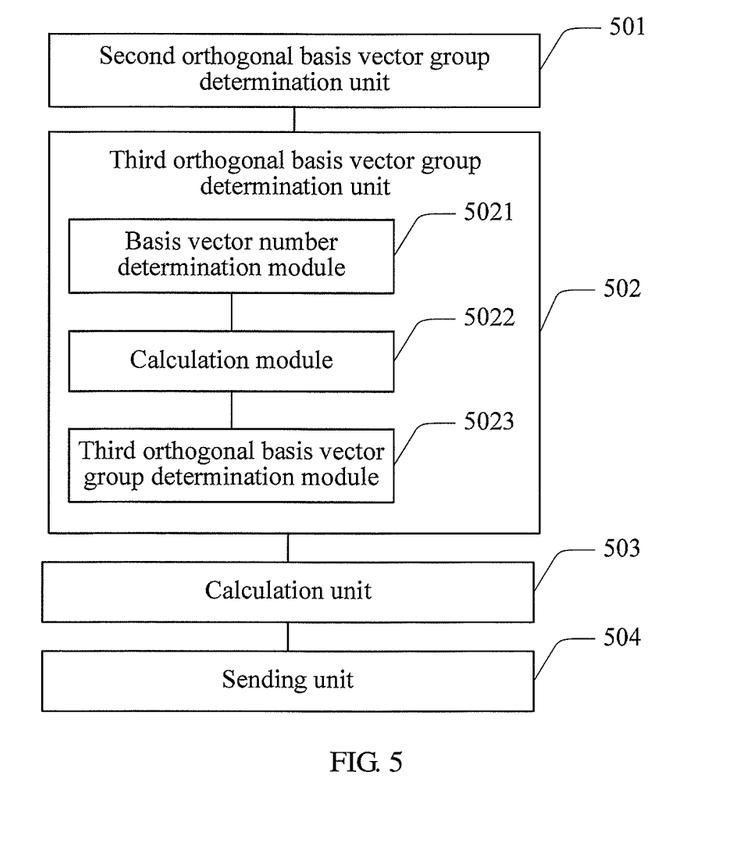
FIG. 5 is a block diagram of an apparatus for feeding back channel state information according to Embodiment 2 of the present application.

The embodiment of the present application provides an apparatus for feeding back channel state information. As shown in FIG. 5, the apparatus includes: a second orthogonal basis vector group determination unit 501, a third orthogonal basis vector group determination unit 502, a basis vector number determination module 5021, a calculation module 5022, a third orthogonal basis vector group determination module 5023, a calculation unit 503, and a sending unit 504.

Figure 6:
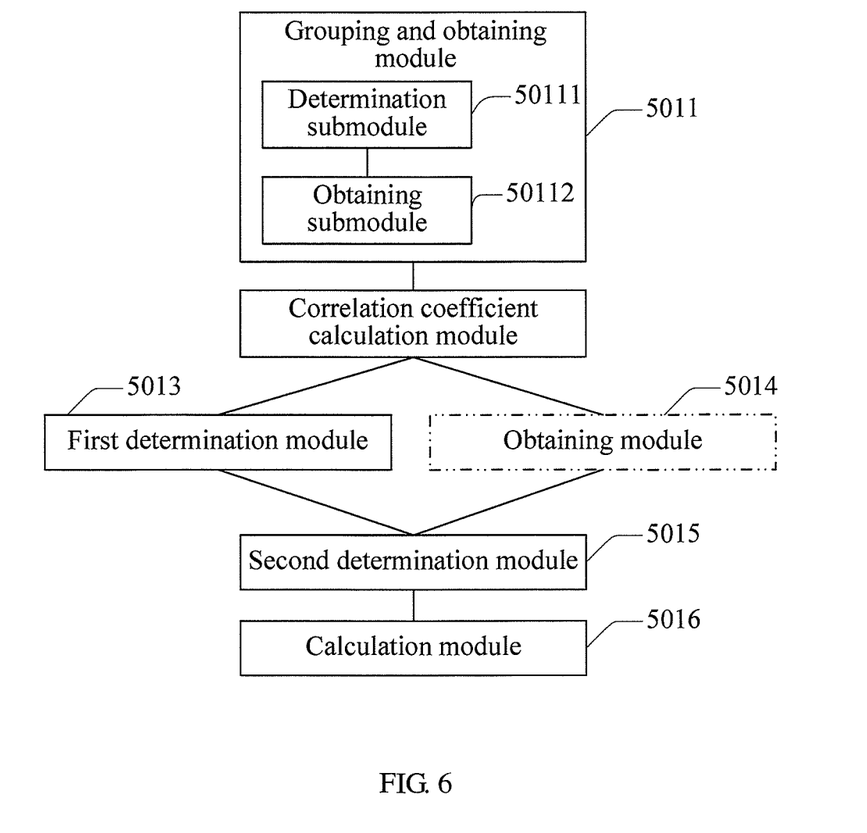
FIG. 6 is a block diagram of a second orthogonal basis vector group determination unit according to Embodiment 2 of the present application.

The second orthogonal basis vector group determination unit 501 is configured to determine a second orthogonal basis vector group and a group number of the second orthogonal basis vector group according to a pre-defined first basis vector group, where each basis vector of the first basis vector group is a Kronecker product of basis vectors corresponding to at least two directions of a horizontal direction, a vertical direction, and a polarization direction;

Specifically, as shown in FIG. 6, the second orthogonal basis vector group determination unit 501 includes a grouping and obtaining module 5011, a correlation coefficient calculation module 5012, a first determination module 5013, an obtaining module 5014, a second determination module 5015, a calculation module 5016, a determination submodule 50111, and an obtaining submodule 50112.

The second orthogonal basis vector group determination unit 501 determines the second orthogonal basis vector group and the group number of the second orthogonal basis vector group in the following two manners.

Manner 1:

The grouping and obtaining module 5011 in the second orthogonal basis vector group determination unit 501 is configured to group the pre-defined first basis vector group and obtain at least one orthogonal basis vector group.

The correlation coefficient calculation module 5012 in the second orthogonal basis vector group determination unit 501 is configured to traverse each code word in any one of the orthogonal basis vector group, and calculate a correlation coefficient between the each code word and a channel eigenvector to be quantified in each data layer separately.

According to the calculated correlation coefficients, the first determination module 5013 in the second orthogonal basis vector group determination unit 501 determines a maximum correlation coefficient in the correlation coefficients of the channel eigenvector of the each data layer.

The obtaining module 5014 in the second orthogonal basis vector group determination unit 501 is configured to calculate the sum of the maximum correlation coefficients and obtain a first correlation coefficient sum; and determine the sum of the maximum correlation coefficients in all groups and obtain first correlation coefficient sums in all the groups according to the method for calculating the sum of the maximum correlation coefficients.

According to the first correlation coefficient sums in all the groups, the second determination module 5015 in the second orthogonal basis vector group determination unit 501 determines a group where a maximum first correlation coefficient sum is located as the second orthogonal basis vector group and determines the group number of the second orthogonal basis vector group.

Manner 2:

The grouping and obtaining module 5011 is configured to group the pre-defined first basis vector group and obtain at least one orthogonal basis vector group.

The correlation coefficient calculation module 5012 is further configured to traverse each code word in any one of the orthogonal basis vector group, calculate a correlation coefficient between the each code word and the channel eigenvector to be quantified in the $i^{th}$ data layer separately, and sort the calculated correlation coefficients of the channel eigenvector of the $i^{th}$ data layer in descending order, where i is a positive integer and the $i^{th}$ data layer is any one of data layers in a transmission channel.

The calculation module 5016 in the second orthogonal basis vector group determination unit 501 is configured to calculate, according to the number of preset code words, the sum of the former K(i) correlation coefficients of the correlation coefficients sorted in descending order, where K(i) is the number of the preset code words; and according to the method for calculating the sum of the correlation coefficients, calculate a correlation coefficient between the each code word and the channel eigenvector to be quantified in each data layer separately and calculate the sum of correlation coefficients of the number corresponding to the number of the preset code words after the correlation coefficients are sorted in descending order.

The obtaining module 5014 is configured to calculate sums of the correlation coefficients of the channel eigenvectors to be quantified in all data layers and obtain a second correlation coefficient sum.

The second determination module 5015 is configured to determine, according to the second correlation coefficient sums in all the groups, a group where a maximum second correlation coefficient sum is located as the second orthogonal basis vector group, and determine the group number of the second orthogonal basis vector group.

Further, the determination submodule 50111 in the grouping and obtaining module 5011 is configured to determine, according to the pre-defined first basis vector group, an orthogonal basis vector group separately in at least two directions of the horizontal direction, the vertical direction, and the polarization direction.

The obtaining submodule 50112 in the grouping and obtaining module 5011 selects any one group randomly from the orthogonal basis vector groups in the at least two directions separately, forms an orthogonal basis vector group and obtains at least one orthogonal basis vector group.

After the second orthogonal basis vector group is determined, the third orthogonal basis vector group determination unit 502 is configured to determine a third orthogonal basis vector group corresponding to each data layer according to the second orthogonal basis vector group, where in the third orthogonal basis vector groups corresponding to the data layers, the number of vectors in at least one of the third orthogonal basis vector groups is greater than 1.

Further, the basis vector number determination module 5021 in the third orthogonal basis vector group determination unit 502 is configured to determine the number $K(i)$ of basis vectors of the third orthogonal basis vector group corresponding to the $i^{th}$ data layer.

According to each code word of the second orthogonal basis vector group, the calculation module 5022 is configured to calculate a correlation coefficient between the each code word and the channel eigenvector of the $i^{th}$ data layer, and sort the correlation coefficients in descending order.

According to the $K(i)$, the third orthogonal basis vector group determination module 5023 determines the code word corresponding to the former $K(i)$ correlation coefficients sorted in descending order as the third orthogonal basis vector group corresponding to the $i^{th}$ data layer.

According to the method for determining the third orthogonal basis vector group corresponding to the $i^{th}$ data layer, the third orthogonal basis vector group corresponding to the each data layer may be determined.

According to the third orthogonal basis vector group corresponding to the each data layer, the calculation unit 503 calculates a second-level code word in the each data layer separately. The calculation unit 503 is specifically configured to calculate a second-level code word corresponding to the $i^{th}$ data layer according to the orthogonal basis vector group corresponding to the $i^{th}$ data layer; and calculate the second-level code word corresponding to the each data layer according to the method for calculating the second-level code word.

Further, according to $v_e(i)=G(i)x(i)$, the calculation unit 503 calculates the second-level code word $x(i)$ corresponding to the $i^{th}$ data layer, where $v_e(i)$ is a channel eigenvector of the $i^{th}$ data layer and $G(i)$ is a matrix formed by all vectors in the third orthogonal basis vector group corresponding to the $i^{th}$ data layer.

The sending unit 504 is configured to send the group number of the second orthogonal basis vector group, the third orthogonal basis vector group corresponding to the each data layer, and the second-level code word corresponding to the each data layer to abase station, so that the base station may synthesize a multi-layer code word.

When the number of vectors in the third orthogonal basis vector group corresponding to the each data layer is equal to 1, the second-level code word does not need to be calculated.

The sending unit 504 is further configured to send the group number of the second orthogonal basis vector group and the third orthogonal basis vector group corresponding to the each data layer to the base station, so that the base station may synthesize a multi-layer code word.

The sending unit 504 is specifically configured to: send a first feedback message to the base station, where the first feedback message includes the group number of the second orthogonal basis vector group and the third orthogonal basis vector group corresponding to the each data layer; and send a second feedback message to the base station, where the second feedback message includes the second-level code word corresponding to the each data layer.

Alternatively, the first feedback message and the second feedback message are sent to the base station separately in a manner of performing transmission at least once; or the first feedback message and the second feedback message are sent to the base station at the same time.

In the embodiment of the present application, the third orthogonal basis vector groups corresponding to the data layers are orthogonal to each other and an intersection set between the third orthogonal basis vector groups is null.

According to the apparatus for feeding back channel state information provided in the embodiment of the present application, the second orthogonal basis vector group determination unit and the third orthogonal basis vector group determination unit determine a second orthogonal basis vector group and a third orthogonal basis vector group corresponding to each data layer separately, then the calculation unit separately calculates a second-level code word in the each data layer, the sending unit sends a group number of the second orthogonal basis vector group, the third orthogonal basis vector group corresponding to the each data layer, and the second-level code corresponding to the each data layer to a base station, so that the base station may synthesize a multi-layer code word. Compared with that when the prior art is adopted to feed back the channel state information, the DFT code word of the ULA only relates to a horizontal dimension and only a single-layer code word technology is adopted; when an antenna array is multi-dimensional and a code word vector has multiple dimensions, the prior art is inapplicable, in the solutions provided in the embodiments of the present application, the channel state information may be fed back in multi-layer data transmission based on a synthetic codebook in a multi-dimensional antenna array and the number of feedback bits may be reduced.

The foregoing descriptions are merely several embodiments of the present application, but not intended to limit the present application. Various variations and modifications made by persons skilled in the art without departing from the spirit of the present application fall within the scope of the present application. Therefore, the protection scope of the present application is subject to the appended claims.

What is claimed is:

1. A method for feeding back channel state information, the method comprising:
 determining a second orthogonal basis vector group and a group number of the second orthogonal basis vector group according to a pre-defined first basis vector group, wherein each basis vector of the first basis vector group is a Kronecker product of basis vectors corresponding to at least two directions of a horizontal direction, a vertical direction, and a polarization direction;
 determining a third orthogonal basis vector group corresponding to each data layer according to the second orthogonal basis vector group, wherein in the third orthogonal basis vector groups corresponding to the data layers, a number of vectors in at least one of the third orthogonal basis vector groups is greater than 1;

calculating a second-level code word of each data layer separately according to the third orthogonal basis vector group corresponding to the each data layer; and sending the group number of the second orthogonal basis vector group, the third orthogonal basis vector group corresponding to the each data layer, and the second-level code word corresponding to the each data layer to a base station, so that the base station may synthesize a multi-layer code word.

2. The method for feeding back channel state information according to claim 1, wherein determining a second orthogonal basis vector group and a group number of the second orthogonal basis vector group according to a pre-defined first basis vector group comprises:

grouping the pre-defined first basis vector group and obtaining at least one orthogonal basis vector group;

traversing each code word in any one of the orthogonal basis vector group and separately calculating a correlation coefficient between the each code word and a channel eigenvector to be quantified in each data layer;

determining a maximum correlation coefficient in the correlation coefficients of the channel eigenvector of the each data layer according to the calculated correlation coefficients;

calculating a sum of the maximum correlation coefficients and obtaining a first correlation coefficient sum;

determining the sum of the maximum correlation coefficients in all groups and obtaining first correlation coefficient sums in all the groups according to the method for calculating the sum of the maximum correlation coefficients; and determining, according to the first correlation coefficient sums in all the groups, a group where a maximum first correlation coefficient sum is located as the second orthogonal basis vector group, and determining the group number of the second orthogonal basis vector group.

3. The method for feeding back channel state information according to claim 1, wherein determining a second orthogonal basis vector group and a group number of the second orthogonal basis vector group according to a pre-defined first basis vector group comprises:

grouping the pre-defined first basis vector group and obtaining at least one orthogonal basis vector group;

traversing each code word in any one of the orthogonal basis vector group, calculating a correlation coefficient between the each code word and a channel eigenvector to be quantified in the $i^{th}$ data layer separately, and sorting the calculated correlation coefficients of the channel eigenvector of the $i^{th}$ data layer in descending order, wherein i is a positive integer and the $i^{th}$ data layer is any one of data layers in a transmission channel;

calculating a sum of former K(i) correlation coefficients of the correlation coefficients sorted in descending order according to a number of preset code words, wherein K(i) is the number of the preset code words;

calculating, according to the method for calculating the sum of the correlation coefficients, a correlation coefficient between the each code word and a channel eigenvector to be quantified in each data layer separately, and calculating the sum of correlation coefficients of the number corresponding to the number of the preset code words after the correlation coefficients are sorted in descending order;

calculating sums of the correlation coefficients of the channel eigenvectors to be quantified in all data layers and obtaining a second correlation coefficient sum; and determining, according to the second correlation coefficient sums in all groups, a group where a maximum second correlation coefficient sum is located as the second orthogonal basis vector group, and determining the group number of the second orthogonal basis vector group.

4. The method for feeding back channel state information according to claim 3, wherein grouping the pre-defined first basis vector group and obtaining at least one orthogonal basis vector group comprises:

determining an orthogonal basis vector group in at least two directions of the horizontal direction, the vertical direction, and the polarization direction separately according to the pre-defined first basis vector group; and selecting any one group randomly from the orthogonal basis vector groups in the at least two directions separately, forming an orthogonal basis vector group and obtaining at least one orthogonal basis vector group.

5. The method for feeding back channel state information according to claim 4, wherein grouping the pre-defined first basis vector group and obtaining at least one orthogonal basis vector group comprises:

determining an orthogonal basis vector group in at least two directions of the horizontal direction, the vertical direction, and the polarization direction separately according to the pre-defined first basis vector group; and selecting any one group randomly from the orthogonal basis vector groups in the at least two directions separately, forming an orthogonal basis vector group and obtaining at least one orthogonal basis vector group.

6. The method for feeding back channel state information according to claim 1, wherein determining a third orthogonal basis vector group corresponding to each data layer according to the second orthogonal basis vector group comprises:

determining a number K(i) of basis vectors of a third orthogonal basis vector group corresponding to an $i^{th}$ data layer;

calculating, according to each code word in the second orthogonal basis vector group, a correlation coefficient between the each code word and the channel eigenvector of the $i^{th}$ data layer, and sorting the correlation coefficients in descending order;

determining, according to the number K(i), the code word corresponding to former K(i) correlation coefficients sorted in descending order as the third orthogonal basis vector group corresponding to the $i^{th}$ data layer; and determining the third orthogonal basis vector group corresponding to the each data layer according to the method for determining the third orthogonal basis vector group.

7. The method for feeding back channel state information according to claim 1, wherein calculating a second-level code word corresponding to each data layer separately according to the third orthogonal basis vector group corresponding to the each data layer comprises:

calculating the second-level code word corresponding to an $i^{th}$ data layer according to the third orthogonal basis vector group corresponding to the $i^{th}$ data layer; and calculating the second-level code word corresponding to the each data layer according to the method for calculating the second-level code word.

8. The method for feeding back channel state information according to claim 7, wherein calculating the second-level code word corresponding to the $i^{th}$ data layer according to the third orthogonal basis vector group corresponding to the $i^{th}$ data layer comprises:

calculating the second-level code word x(i) corresponding to the $i^{th}$ data layer according to $v_e(i)=G(i)x(i)$, wherein $v_e(i)$ is a channel eigenvector of the $i^{th}$ data layer and G(i) is a matrix formed by all vectors in the third orthogonal basis vector group corresponding to the $i^{th}$ data layer.

9. The method for feeding back channel state information according to claim 1, wherein sending the group number of the second orthogonal basis vector group, the third orthogonal basis vector group corresponding to the each data layer, and the second-level code word corresponding to the each data layer to a base station, so that the base station may synthesize a multi-layer code word comprises:

sending a first feedback message to the base station, wherein the first feedback message comprises the group number of the second orthogonal basis vector group and the third orthogonal basis vector group corresponding to the each data layer; and sending a second feedback message to the base station, wherein the second feedback message comprises the second-level code word corresponding to the each data layer.

10. The method for feeding back channel state information according to claim 9, wherein sending the first feedback message and the second feedback message to the base station separately in a manner of performing transmission at least once; or sending the first feedback message and the second feedback message to the base station at the same time in a manner of performing transmission at least once.

11. An apparatus for feeding back channel state information, the apparatus comprising:

a receiver; and a transmitter, wherein the apparatus is configured to determine a second orthogonal basis vector group and a group number of the second orthogonal basis vector group according to a pre-defined first basis vector group, wherein each basis vector of the first basis vector group is a Kronecker product of basis vectors corresponding to at least two directions of a horizontal direction, a vertical direction, and a polarization direction;

determine a third orthogonal basis vector group corresponding to each data layer according to the second orthogonal basis vector group, wherein in the third orthogonal basis vector groups corresponding to the data layers, a number of vectors in at least one of the third orthogonal basis vector groups is greater than 1;

calculate a second-level code word of each data layer separately according to the third orthogonal basis vector group corresponding to the each data layer; and send the group number of the second orthogonal basis vector group, the third orthogonal basis vector group corresponding to the each data layer, and the second-level code word corresponding to the each data layer to a base station, so that the base station may synthesize a multi-layer code word.

12. The apparatus according to claim 11, wherein the apparatus is further configured to:

group the pre-defined first basis vector group and obtain at least one orthogonal basis vector group;

traverse each code word in any one of the orthogonal basis vector group and separately calculate a correlation coefficient between the each code word and a channel eigenvector to be quantified in each data layer;

determine a maximum correlation coefficient in the correlation coefficients of the channel eigenvector of the each data layer according to the calculated correlation coefficients;

calculate a sum of the maximum correlation coefficients and obtain a first correlation coefficient sum; and determine, according to the first correlation coefficient sums in all groups, a group where a maximum first correlation coefficient sum is located as the second orthogonal basis vector group, and determine the group number of the second orthogonal basis vector group.

13. The apparatus according to claim 11, wherein the apparatus is further configured to:

group the pre-defined first basis vector group and obtain at least one orthogonal basis vector group;

traverse each code word in any one of the orthogonal basis vector group, calculate a correlation coefficient between the each code word and a channel eigenvector to be quantified in the $i^{th}$ data layer separately, and sort the calculated correlation coefficients of the channel eigenvector of the $i^{th}$ data layer in descending order, wherein i is a positive integer and the $i^{th}$ data layer is any one of data layers in a transmission channel;

calculate, according to a number of preset code words, a sum of former K(i) correlation coefficients of the correlation coefficients sorted in descending order, wherein K(i) is the number of the preset code words;

calculate sums of the correlation coefficients of the channel eigenvectors to be quantified in all data layers and obtain a second correlation coefficient sum; and determine, according to the second correlation coefficient sums in all groups, a group where a maximum second correlation coefficient sum is located as the second orthogonal basis vector group, and determine the group number of the second orthogonal basis vector group.

14. The apparatus according to claim 12, wherein the apparatus is further configured to:

separately determine an orthogonal basis vector group in at least two directions of the horizontal direction, the vertical direction, and the polarization direction according to the pre-defined first basis vector group; and select any one group randomly from the orthogonal basis vector groups in the at least two directions separately, form an orthogonal basis vector group, and obtain at least one orthogonal basis vector group.

15. The apparatus according to claim 13, wherein the apparatus is further configured to:

separately determine an orthogonal basis vector group in at least two directions of the horizontal direction, the vertical direction, and the polarization direction according to the pre-defined first basis vector group; and select any one group randomly from the orthogonal basis vector groups in the at least two directions separately, form an orthogonal basis vector group, and obtain at least one orthogonal basis vector group.

16. The apparatus according to claim 11, wherein the apparatus is further configured to:
   determine a number K(i) of basis vectors of the third orthogonal basis vector group corresponding to an $i^{th}$ data layer;
   calculate a correlation coefficient between the each code word and the channel eigenvector of the $i^{th}$ data layer according to each code word in the second orthogonal basis vector group, and sort the correlation coefficients in descending order; and
   determine, according to the number K(i), the code word corresponding to former K(i) correlation coefficients sorted in descending order as the third orthogonal basis vector group corresponding to the $i^{th}$ data layer.

17. The apparatus according to claim 11, wherein the apparatus is further configured to:
   calculate a second-level code word corresponding to an $i^{th}$ data layer according to the third orthogonal basis vector group corresponding to the $i^{th}$ data layer; and
   calculate the second-level code word corresponding to the each data layer according to the method for calculating the second-level code word.

18. The apparatus according to claim 17, wherein the apparatus is further configured to:
   calculate the second-level code word x(i) corresponding to the $i^{th}$ data layer according to $v_e(i)=G(i)x(i)$, wherein $v_e(i)$ is a channel eigenvector of the $i^{th}$ data layer and G(i) is a matrix formed by all vectors in the third orthogonal basis vector group corresponding to the $i^{th}$ data layer.

19. The apparatus according to claim 11, wherein the apparatus is further configured to:
   send a first feedback message to the base station, wherein the first feedback message comprises the group number of the second orthogonal basis vector group and the third orthogonal basis vector group corresponding to the each data layer; and
   send a second feedback message to the base station, wherein the second feedback message comprises the second-level code word corresponding to the each data layer.

20. The apparatus according to claim 19, wherein:
   the first feedback message and the second feedback message are sent to the base station separately in a manner of performing transmission at least once; or
   the first feedback message and the second feedback message are sent to the base station at the same time.

* * * * *